United States Patent [19]

Elsaesser et al.

[11] 4,060,979
[45] Dec. 6, 1977

[54] STALL WARNING DETECTOR FOR GAS TURBINE ENGINE

[75] Inventors: Fred L. Elsaesser, Glastonbury; Joseph H. Hall, East Hartford, both of Conn.

[73] Assignee: United Technologies Corporation, Hartford, Conn.

[21] Appl. No.: 633,308

[22] Filed: Nov. 19, 1975

[51] Int. Cl.² .......................... F02C 9/02; F02C 9/14
[52] U.S. Cl. ................................ 60/39.03; 60/39.27; 60/39.28 R; 60/39.28 T; 60/39.29; 73/117.3; 415/27
[58] Field of Search ................. 60/39.02, 39.03, 39.29, 60/39.27, 39.28 R, 39.28 T; 340/275 S; 73/117.3; 415/27

[56] References Cited

U.S. PATENT DOCUMENTS

| 3,137,210 | 6/1964 | Gavin | 137/125 |
|---|---|---|---|
| 3,172,259 | 3/1965 | North | 60/39.29 X |
| 3,395,534 | 8/1968 | Owen | 60/39.29 |
| 3,426,322 | 2/1969 | Balo | 60/39.29 |
| 3,688,504 | 9/1972 | Hutchinson | 60/39.29 X |
| 3,759,037 | 9/1973 | Kiscaden | 60/223 |
| 3,830,055 | 8/1974 | Erlund | 60/39.28 R |
| 3,867,717 | 2/1975 | Moehring | 60/39.28 R |
| 3,876,326 | 4/1975 | Weitz | 60/39.29 X |

Primary Examiner—Clarence R. Gordon
Attorney, Agent, or Firm—Norman Friedland

[57] ABSTRACT

A stall detector for a gas turbine engine is disclosed where detection is obtained by continuously monitoring turbine temperature and either compressor speed or bleed valve position and provide a stall signal solely when turbine temperature exceeds a predetermined value and the compressor speed decreases at a predetermined rate or when turbine temperature exceeds a predetermined value at the time that the compressor bleeds are in the opened position.

6 Claims, 2 Drawing Figures

STALL WARNING DETECTOR FOR GAS TURBINE ENGINE

BACKGROUND OF THE INVENTION

This invention relates to means for detecting stall in a gas turbine engine and more particularly to a stall detection system that continuously monitors two engine operating parameters and when predetermined conditions of both are met will produce an output signal indicative of stall.

As is well known, stall is a phenomenon that may occur in the compressor of a gas turbine engine which, if allowed to persist unabated, would impair engine performance and/or lead to the destruction of the engine. While the theory of stall is not completely understood, suffice it to say that stall is that effect occasioned when sufficient number of compressor blades stall and a momentary reversing of the airflow occurs through the compressor. This causes compressor discharge pressure to drop very rapidly and sometimes results in continual pressure oscillations until some corrective action is taken.

The art has seen a number of methods intended to either sense when stall is imminent and warn the pilot so that he can take corrective action or design the engine controls such that the area of engine operation where stall is likely to occur is avoided.

For example, fuel controls limit the amount of fuel admitted to the engine during acceleration so as to accelerate along a predetermined acceleration schedule that accounts for stall. Another method, which may be contemporaneously employed with this acceleration scheduling system, is to measure compressor discharge pressure and open compressor bleed valves whenever a predetermined compressor pressure change or rate of change occurs. And still another method which is described in U.S. Pat. No. 3,867,717 and granted to John Theodore Moehring and Vigil Willis Lawson on Feb. 18, 1975 is the utilization of computed compressor pressures and turbine or exit temperatures as a means for determining when stall is present.

While such stall detection and prevention means as described above may be effective for certain engines and/or their applications they are not always effective for other engines and/or their applications. For example, it may happen that under the same values of the computed compressor pressures or their rates and turbine temperatures or their rates another engine operation may occur which would lead to a false indication of stall; or the monitoring of the parameter may not be readily accessible or the inclusion of the sensing probes may interfere with the gas path and impair engine performance. Therefore the selection of the stall controller comes down to what stall system is best for that engine and its applications, what parameters are readily accessible, which system will provide the highest degree of accuracy, which one is fastest and a host of other considerations.

This invention contemplates continuously monitoring two engine operating parameters and when both are at predetermined value, the stall warning detector will produce an output signal.

The output signal can then be utilized to provide a warning signal to the aircraft pilot, as by a visual or sound signal so that he can take corrective action, such as retarding the power lever. Additionally, this signal can be utilized to initiate corrective action in one of the following ways:
1. de-rich engine fuel flow
2. shutoff fuel
3. open compressor bleeds
4. change compressor stator vane angle
5. change aircraft inlet geometry
6. change engine outlet geometry Furthermore the signal can be incorporated in a system that would initiate an automatic stall recovery sequence by shutting-off fuel, start ignition and reinitiate fuel flow in a timed sequence.

We have found that the turbine inlet temperature (TIT) or turbine exit temperature (TET) are viable parameters for indicating stall if these values are excessively high (or abnormally so) and that the speed of the compressor (either low compressor ($N_1$) or high compressor ($N_2$) in a twin spool engine) is decreasing or not increasing. Also in engines that utilize compressor bleed valves and particularly the ones that are opened as a function of compressor pressure ratio, the temperature signal together with a bleed position signal can be utilized as an indication of stall or imminent stall.

Computed values of these parameters to an "AND" gate to obtain an output signal indicative of stall solely when TIT or TET is excessively high and the bleeds are opened or when TIT or TET is excessively high and $N_1$ or $N_2$ is rapidly decreasing.

SUMMARY OF THE INVENTION

An object of this invention is to provide an improved stall warning system for an axial flow gas turbine engine.

A still further object of this invention is to provide a stall warning system that utilizes either TIT or TET together with another engine operating parameter solely when predetermined conditions of each signal is satisfied.

A still further object of this invention is to provide a stall warning system that produces an output signal solely when both TIT or TET are excessively high and the engine bleeds are opened.

A still further object of this invention is to provide a stall warning system that produces an output signal solely when TIT or TET is excessively high and $N_1$ or $N_2$ is at a predetermined rate of decreasing speed.

Other features and advantages will be apparent from the specification and claims and from the accompanying drawings which illustrate an embodiment of the invention.

DESCRIPTION OF THE PREFERRED EMBODIMENT

Figure 1:
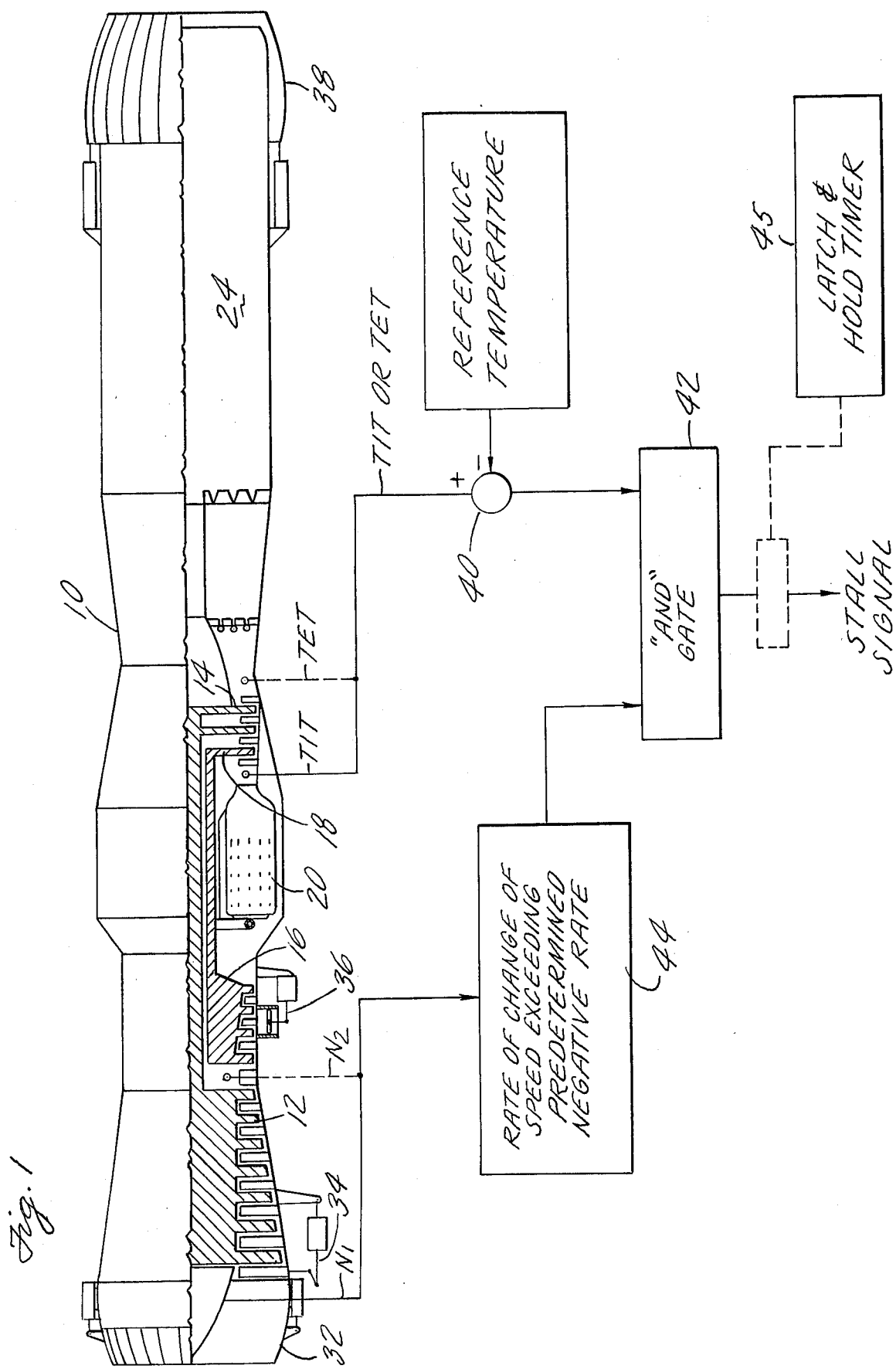
FIG. 1 is a schematic representation, partially in section of a gas turbine engine, and a schematic representation of a stall warning system connected thereto.

For the purpose of this description, the gas turbine engine illustrated in FIG. 1 typifies any number of different types of engines where this invention may be utilized. Such engines may include, as for example, the JT-3D, JT-8D, JT-9D, TF-30, JT-12 manufactured by the Pratt & Whitney Aircraft Division of United Technologies Corporation, but are not limited thereto. Suffice it to say that this invention is applicable where stall is a problem which is generally the case in any axial flow compressor.

Essentially, the gas turbine engine exemplified by FIG. 1 is a twin spool axial flow gas turbine engine having an engine casing 10 in which the low pressure compressor 12 and driving turbine 14 and high pressure compressor 16 and its driving turbine 18 are rotary mounted. The burner section 20 which burns fuel metered thereto by fuel control (not shown) generates gases for driving the turbines which then are exhausted through a nozzle to produce thrust or the thrust is augmented by a suitable afterburner 24.

Depending on the particular engine and its application it may include a variable geometry inlet duct 32, variable compressor stators generally illustrated by reference numeral 34, and/or compressor bleeds, generally illustrated by reference numeral 36.

The description above is for the purpose of describing in generalities a typical engine and since it doesn't form a part of this invention, except for the fact that existing components may be utilized to execute this invention a detailed description is omitted for the sake of convenience and simplicity. However for further details reference should be made to the literature of the engines noted above.

Referring to FIG. 1, this invention contemplates continual monitoring TIT or TET by suitable temperature sensors, such as thermocouples or pyrometers and comparing its value with a referenced value in the comparator or summing junction 40. If the value of the temperature is excessive (abnormally high) i.e. above the reference value, the output will be applied as one of the inputs to "AND" gate 42.

Likewise speed of the compressor, either $N_1$ or $N_2$ will be continuously monitored and when its rate of change as calculated by any suitable rate device or circuitry shown as box 44 exceeds a predetermined negative rate value it will be applied as the other input signal to "AND" gate 42. "AND" gate 42 which is a well known element serves to provide an output solely when both inputs are impressed thereon. When this occurs, a stall signal will be evidenced at the output.

This signal can be either utilized to activate a warning signal (sound or light) to the aircraft pilot or it may be utilized to indicate corrective action by changing engine inlet geometry 32 or engine exit geometry 38, angle of stator vane 34, compressor bleed 36 or shutoff or de-rich fuel.

Under certain circumstances it may be desirable to hold the stall signal for a predetermined time so that should the sensed parameters oscillate the stall detector may be repeatedly cycled on and off. In this event the control may include a suitable latch and hold mechanism represented by box 45 which will hold the stall signal a predetermined time. Timers of this type are well known and commercially available.

Figure 2:
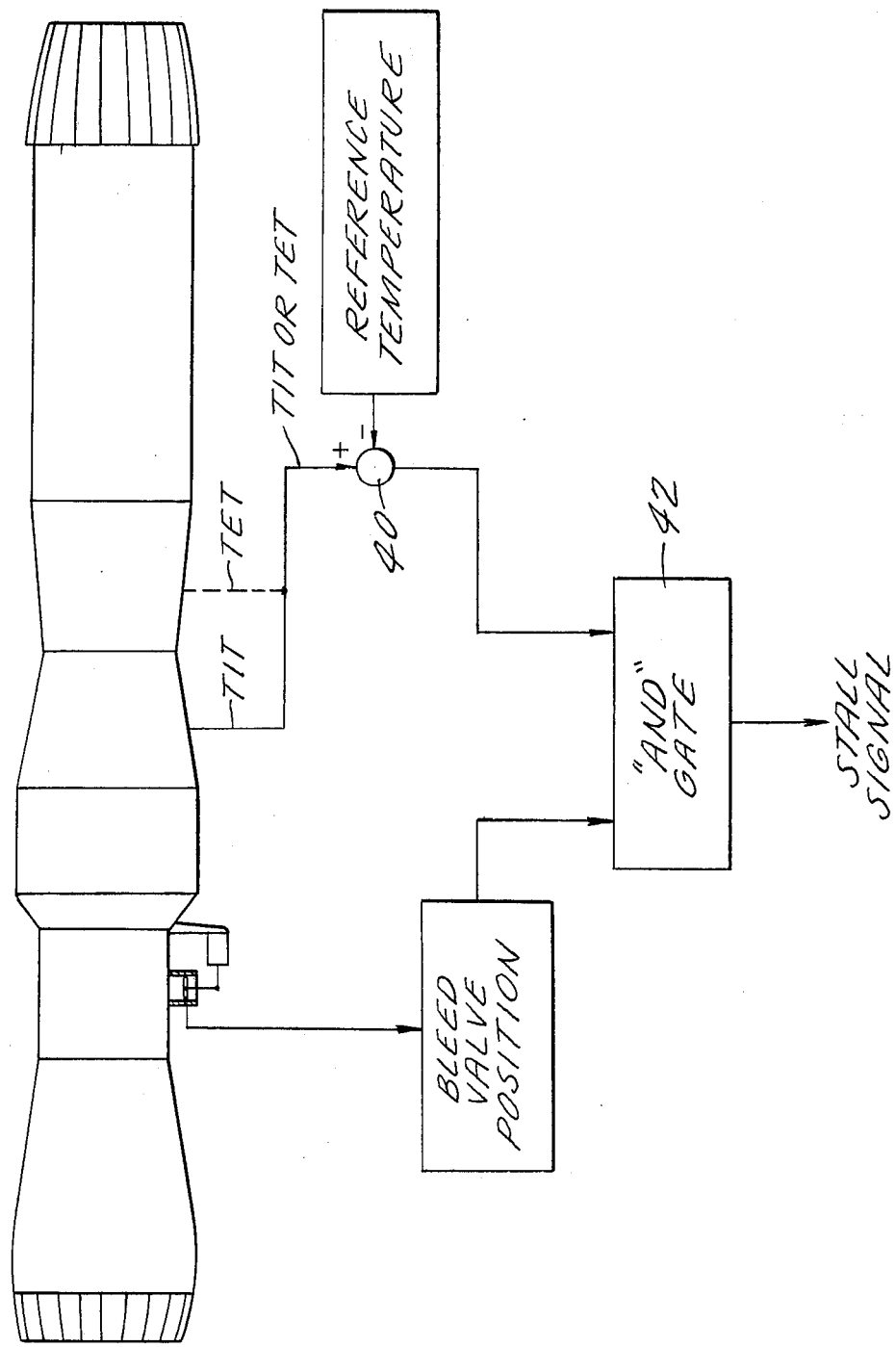
FIG. 2 is a schematic representation of another embodiment of a stall warning system connected to a typical gas turbine engine.

Referring to FIG. 2 where like numerals designate previously described elements the "AND" gate 42 responds to the output of comparator 40, which is an excessive TIT or TET and position of bleed 36. Likewise the output of "AND" gate 42 will produce a stall signal solely when both conditions exist.

By virtue of this invention stall detection is manifested by monitoring the TIT or TET and another engine operating parameter and computing it so that whenever an abnormal decrease in speed or an abnormal bleed opening occurs, a stall warning signal will be produced.

In certain engines the minimum fuel flow may be set too high under certain operating conditions and the stall signal may be utilized to re-set the minimum fuel flow to a lower value when the compressor is in stall. Otherwise, the amount of fuel permitted by the minimum fuel flow schedule before it was changed could cause the engine to overheat, even to an extent of burning it out.

It should be understood that the invention is not limited to the particular embodiments shown and described herein, but that various changes and modifications may be made without departing from the spirit or scope of this novel concept as defined by the following claims.

We claim:

1. A stall detector system for an axial flow gas turbine engine having a compressor, turbine and burner, bleed valve means for bleeding air from said compressor, means for detecting when stall is imminent including a temperature sensor measuring the temperature of the turbine, comparator means for producing a first signal whenever the measured temperature exceeds a referenced value, signal generator means responsive to the position of said bleed valve means for producing a second signal whenever the bleed valve means is open to bleed said compressor, and gate means responsive to both said first signal and said second signal for producing a stall warning output signal whenever both the temperature of said turbine is abnormally high and said bleed valve means is bleeding air from said compressor.

2. A stall indicator as claimed in claim 1 wherein said temperature sensor senses the turbine inlet temperature.

3. A stall indicator as claimed in claim 1 wherein said temperature sensor senses the turbine exit temperature.

4. The method of detecting stall in flow gas turbine engine that includes a compressor, turbine and burner and compressor bleed valves comprising the steps of:
   measuring the temperature in proximity to the turbine so as to produce an output signal whenever this temperature is excessive in relation to normal engine operation,
   measuring the position of the compressor bleed valves so as to produce an output signal whenever the compressor bleed valves are opened,
   combining the outputs obtained in the steps of measuring so as to produce a signal indicative of stall solely when both output signals are present which signal can then be used as a warning or to initiate corrective action.

5. The method as claimed in claim 4 including the step of holding the output signal obtained in the step of combining for a predetermined time interval so as not to release this output signal prematurely.

6. A stall indicator as claimed in claim 1 including time delay means responsive to the stall warning output signal to hold and release said stall warning signal a predetermined interval of time.

* * * * *

UNITED STATES PATENT AND TRADEMARK OFFICE
CERTIFICATE OF CORRECTION

PATENT NO. : 4,060,979

DATED : December 6, 1977

Page 1 of 2

INVENTOR(S) : Fred L. Elsaesser and Joseph H. Hall

It is certified that error appears in the above-identified patent and that said Letters Patent are hereby corrected as shown below:

Column 2, lines 24-28 "Computed values of these parameters to an 'AND' gate to obtain an output signal indicative of stall solely when TIT or TET is excessively high and the bleeds are opened or when TIT or TET is excessively high and $N_1$ or $N_2$ is rapidly decreasing" should read -- In both situations, this invention contemplates continuously monitoring the turbine temperature and either compressor speed or compressor bleed valve position and apply computed values of these parameters to an "AND" gate to obtain an output signal indicative of stall solely when TIT or TET is excessively high

UNITED STATES PATENT AND TRADEMARK OFFICE
CERTIFICATE OF CORRECTION

PATENT NO. : 4,060,979

DATED : December 6, 1977

INVENTOR(S) : Fred L. Elsaesser and Joseph H. Hall

It is certified that error appears in the above-identified patent and that said Letters Patent are hereby corrected as shown below:

and the bleeds are opened or when TIT or TET is excessively high and $N_1$ or $N_2$ is rapidly decreasing.--

Signed and Sealed this

Eighth Day of August 1978

[SEAL]

Attest:

RUTH C. MASON
Attesting Officer

DONALD W. BANNER
Commissioner of Patents and Trademarks